W. B. SMITH.
ROLL REWINDING MACHINE.
APPLICATION FILED JAN. 21, 1915.

1,194,248.

Patented Aug. 8, 1916.
10 SHEETS—SHEET 5.

WITNESSES:
Wm. P. Schmitt
Cecil Long

INVENTOR
W. Brown Smith
BY
ATTORNEY

W. B. SMITH.
ROLL REWINDING MACHINE.
APPLICATION FILED JAN. 21, 1915.

1,194,248.

Patented Aug. 8, 1916.
10 SHEETS—SHEET 8.

WITNESSES:
Wm. C. Schmitt
Cecil Long

INVENTOR
W. Brown Smith
BY T. J. Geisler
ATTORNEY

UNITED STATES PATENT OFFICE.

WILLIAM BROWN SMITH, OF CAMAS, WASHINGTON.

ROLL-REWINDING MACHINE.

1,194,248. Specification of Letters Patent. Patented Aug. 8, 1916.

Application filed January 21, 1915. Serial No. 3,657.

*To all whom it may concern:*

Be it known that I, WILLIAM BROWN SMITH, a citizen of the United States, and a resident of Camas, Clark county, State of Washington, have invented a new and useful Improvement in Roll-Rewinding Machines, of which the following is a specification.

This invention relates to rewinding machines in which a web of paper, or other material, frequently longitudinally slitted into a plurality of strips, is re-wound into smaller sized rolls. These machines are particularly adapted for rewinding toilet paper and toilet towels. In machines of this character heretofore used the steps were as follows: 1st, manually pasting the cores and manually attaching thereto the ends of the strips to be rewound; 2nd, starting the machine; 3rd, gaging the size of the rolls which had to be done by sight, thus requiring constant attention, and not insuring uniformity in number of sheets to the rolls; 4th, stopping the machine when the rolls have reached the desired size, and manually severing the strips from the rolls; 5th, removing the rolls from their arbors; and 6th, substituting another arbor with a new set of cores.

The object of my invention is to produce a machine which shall be continuous in its operation, performing mechanically and automatically all the enumerated steps without interruption, excepting the placing of arbors with blank cores on them in the machine, and the replacing of the wound cores with others. In this way my machine may be run continuously until the whole roll of paper has been rewound into smaller rolls, with the result that my machine has great speed and there is a proportionate reduction of the costs of production. The gaging of the rolls is also done mechanically, and therefore accurately, by the machine. With this brief outline of the purpose of my invention, its construction and operation, may be understood from a description of the accompanying drawings, in which:

Fig 2 is a larger-scale plan view of the winder crank and reversing gear mechanism; the devices which operate the shifter element are omitted; Fig. 2$^a$ is a smaller scale horizontal section of the winder crank mechanism showing the manner of assembly; Fig. 2$^b$ is a sectional view on the line 2$^b$—2$^b$ of Fig. 2; Fig. 3 is a sectional view taken approximately on the line 3—3 of Fig. 1; Fig. 4 is a left or inner side elevation of the parts shown in Fig. 3; Fig. 4$^a$ is a diagram plan view showing the manner in which the rear end of the split nut embraces the devices which are adapted to slide on the rod $m^5$; Fig. 5 is a plan view showing the electrical signal device by means of which the operator will receive an audible sign shortly before the automatic devices act.

Figure 1:
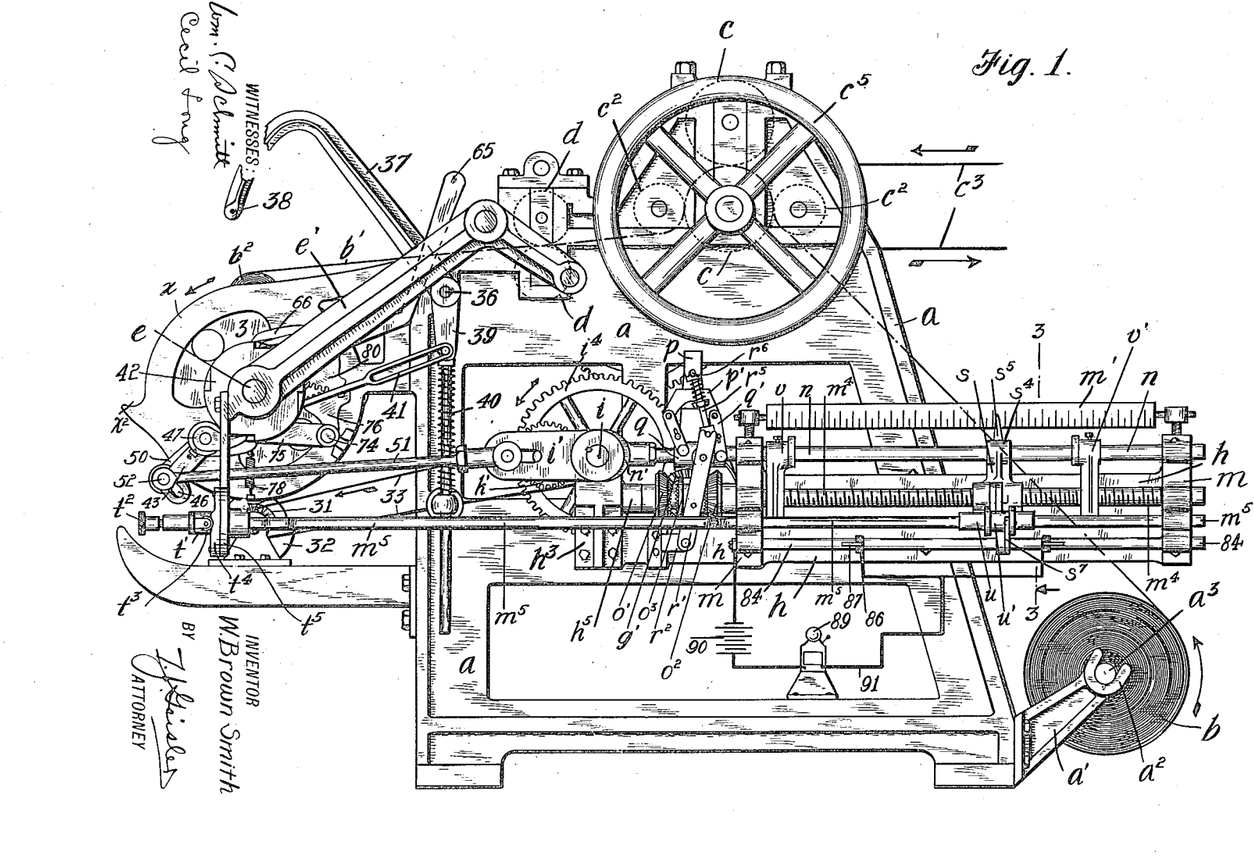
Figure 1 is a near side elevation of the entire machine.
Figure 28:
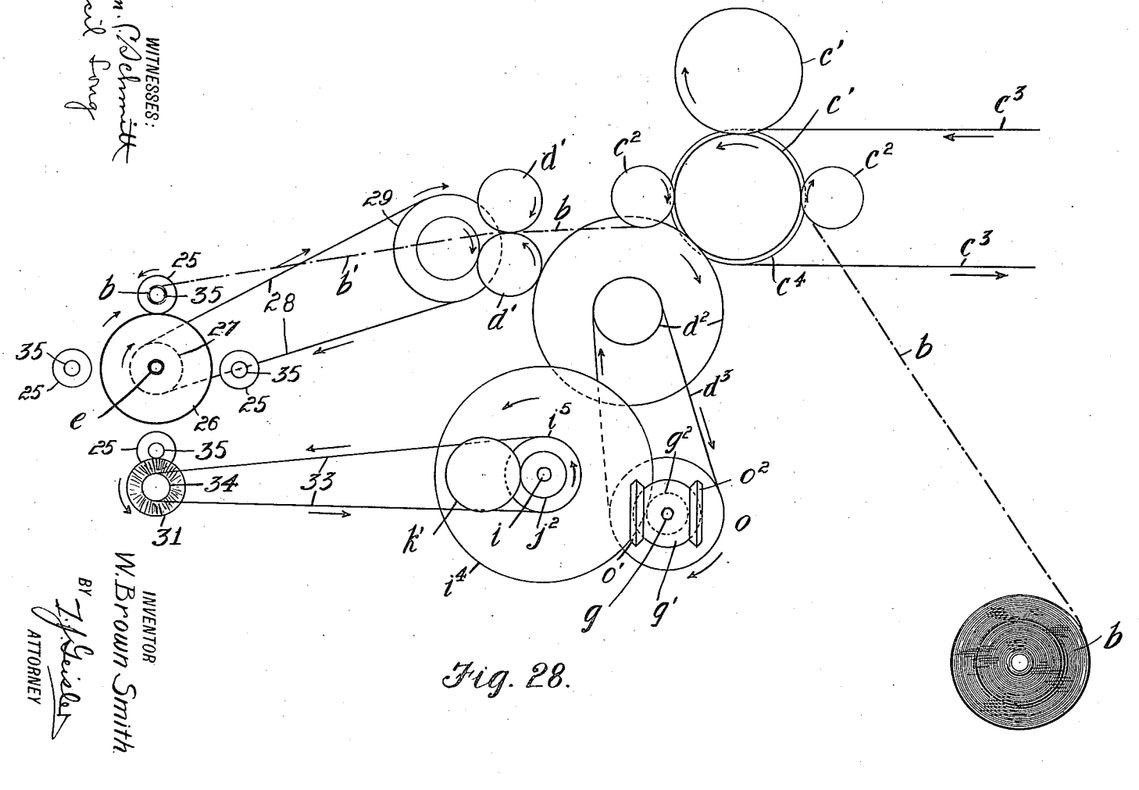
Fig. 28 is a diagrammatic side elevation showing the driving connections between the moving parts of the entire machine.

$a$ represents the frame of my machine, provided with brackets $a'$ made with bearings $a^2$, in which is journaled a mandrel $a^3$, on which the big roll of paper $b$ is placed; see Fig. 1. In the upper part of the machine are mounted the usual perforating rolls, $c, c$, geared together by the gears $c'$; see also Fig. 28.

$c^2$ are idler rolls which hold the paper web close to the lower perforating roll $c$. A belt $c^3$, running from a source of power (not shown), drives the pulley $c^4$, fixed on the shaft of the lower of the perforating rolls, $c, c$.

$c^5$ is a hand wheel of the usual hand braking mechanism, not shown.

$d$ indicates the slitter rolls by which the paper web is longitudinally divided into a plurality of parallel strips, $b'$. Said slitter rolls are geared together by the gears $d'$ which are driven from the perforating roll gears, $c'$, by an inter gear train $d^2$.

$e$ is the rewinder reel shaft, journaled in the arms $e'$, rigidly fixed on the frame $a$.

Figures 2, 2A, 2B:
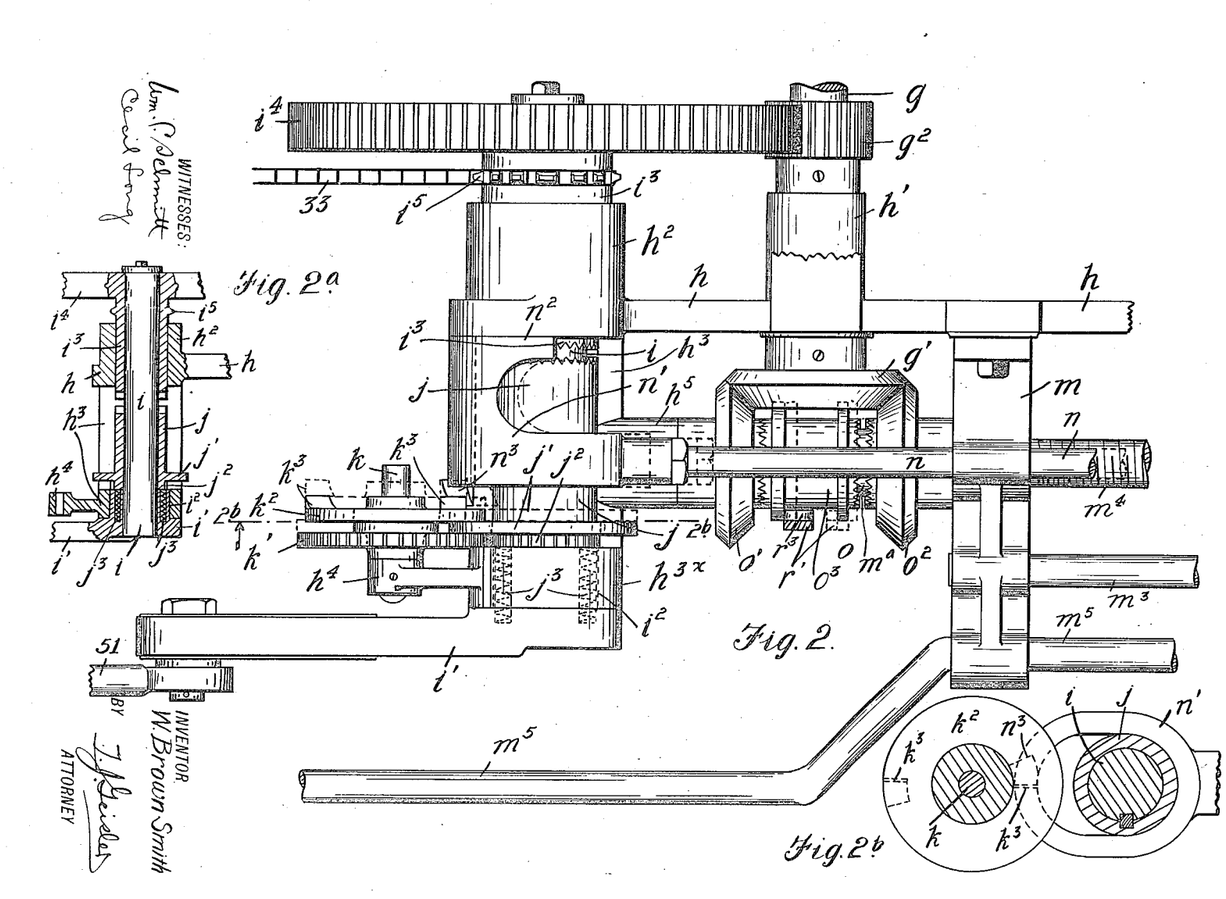

Referring now to Fig. 2, a shaft $g$ is journaled between the frame sides of the machine in parallel alinement with, but below, the perforating rolls, $c, c$. Said shaft, $g$, is constantly driven by a chain drive $d^3$, from the gear train, $d^2$, see Fig. 28. A plate, $h$, is rigidly bolted to the frame of the machine. This plate has two boxes, $h'$, $h^2$, in the former of which one end of the shaft $g$ is journaled, see Figs. 1 and 2. On the left end of the plate $h$, is bolted a bracket, $h^3$, (see Figs. 2 and 3) the extremity of which bracket is formed with an eye $h^{3x}$, and the latter has a projecting arm, $h^4$. A crank-shaft, $i$, is journaled parallel to the shaft $g$ and thereon is mounted the clutch device by means of which the winder crank arm $i'$ is intermittently rotated. A sleeve $i^3$ is mounted on the shaft, $i$, and bears in the box, $h^2$ of the plate $h$. Said crank-arm, $i'$ is keyed on the shaft, $i$, and is made with a hub, $i^2$, which bears in the bracket, $h^3$, see Fig. 2ª. The sleeve $i^3$ has a rigid spur gear $i^4$ meshing with the pinion $g^2$ on the shaft $g$, and a sprocket-wheel, $i^5$. The sleeve $i^3$ constitutes the female member of the clutch element between the constantly driven shaft $g$ and the crank-arm, $i'$. The male member of said clutch is the sleeve $j$, slidably keyed on the shaft, $i$. The male member, $j$, is provided with a peripheral flange $j'$, made with an integral spur pinion $j^2$. (See Figs. 2 and 2ª.) Expansion springs $j^3$, are provided in bores of the hub, $i^2$, of the crank arm, $i'$, which springs bear against the face of the pinion $j^2$, and normally thrust the male clutch-member $j$ into engagement with the female clutch-member $i^3$; the opposed ends of said clutch members being serrated so as to interlock. In the arm $h^4$ of the bracket $h^3$ is fixed a stud shaft $k$. A spur-gear $k'$, meshing with the pinion, $j^2$ is mounted loosely on the stud-shaft $k$ and such spur-gear is made with an integral cam disk $k^2$. The flange $j'$ of the male clutch member $j$ is located between the gear $k'$ and the cam-disk $k^2$, consequently these parts will move as a unit. On the face of the cam-disk $k^2$ are two toes $k^3$, located diametrically opposite, but at unequal distances, from the center of the cam disk $k^2$, (see Fig. 2ᵇ) and they operate alternately to disconnect the male clutch-member $j$ from the clutch member $i^3$ after the crank-arm $i'$ has made one revolution. On the plate $h$, are bolted the brackets $m$, on which is mounted indicating gage-scale $m'$, (see Fig. 1). In connection with said scale the machine may be set to rewind the rolls into any predetermined number of sheets. $n$ is a longitudinally slidable rod bearing in the brackets $m$. Said rod has an elongated slotted head $n'$, which bears on both the members $i^3$ and $j$ of the clutch, see Figs. 2 and 2ᵇ. The slotted head, $n'$ has a projection $n^2$, which bears against the plate $h$. The slotted head $n'$ is also provided with a bevel toe $n^3$, coöperating with the toes $k^3$ on the cam-disk $k^2$. It is to be noted that the gear ratio of the gears $k'$ and $j^2$ are as 2 to 1, and therefore a complete revolution of the crank arm, $i'$, will give only a half revolution of the cam-disk $k^2$.

Figures 3, 4, 4A, 5:
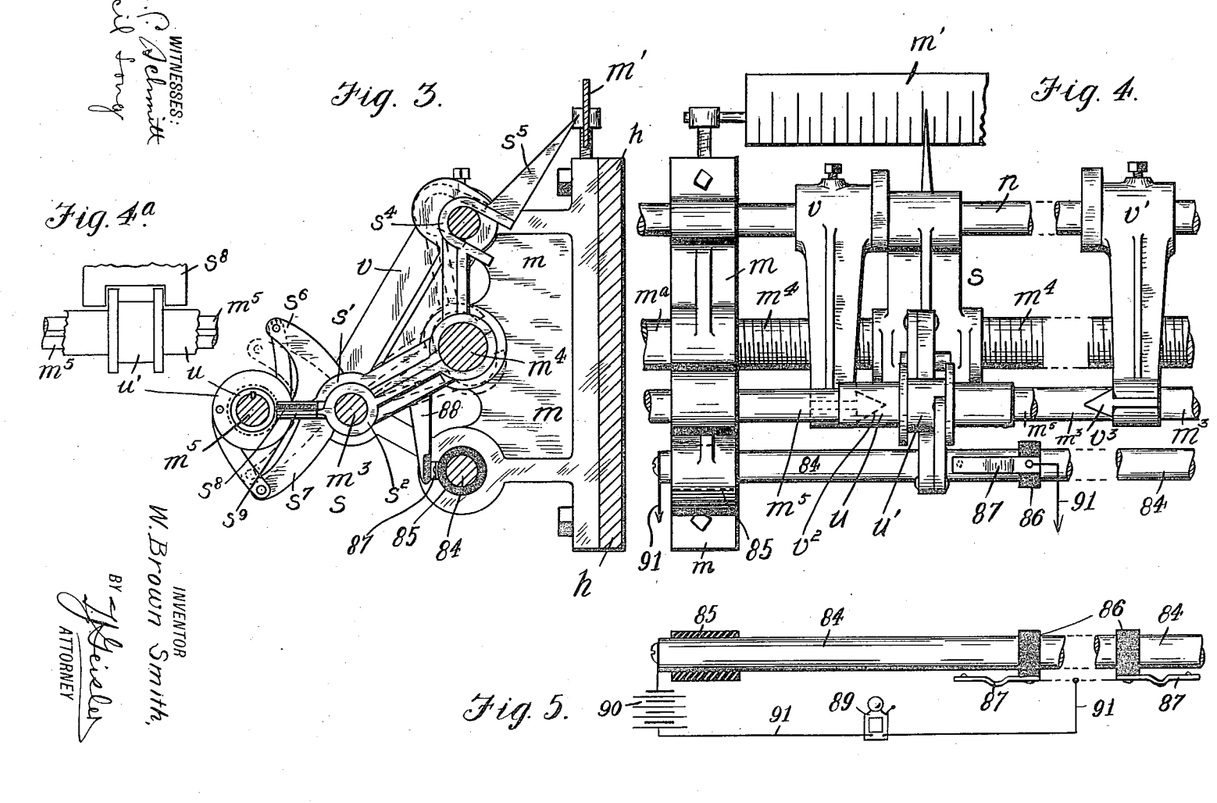
Figure 6:
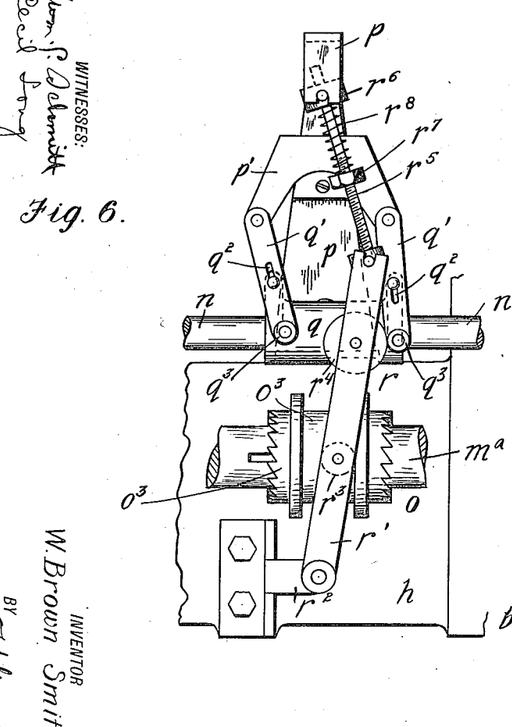
Fig. 6 is a larger scaled side elevation of the shifter element by means of which the reversing gear is operated.

As shown in Figs. 3 and 4, the brackets $m, m$, support a rod $m^3$, and screw $m^4$, the ends of which are journaled in such brackets. The screw $m^4$ has an unthreaded portion $m^a$ journaled in the box $h^5$, of the bracket $h^3$, see Figs. 1, 2 and 4. $o$ represents a reversing gear (see Figs. 1, 2 and 6) of which the two bevel-gears, $o'$, $o^2$, are loose on said projecting portion $m^a$ of the screw $m^4$.

$o^3$, is the slidable clutch-sleeve and $g'$ the meshing gear fast on the continually driven shaft $g$. Thus the members $o'$, $o^2$ of the reversing gear $o$, are constantly driven in opposite directions, and the clutch sleeve $o^3$, is shifted by the movement of the rod $n$ to convert either one of the gears $o'$, $o^2$, into working gears. This function of the reversing gear is to reverse the rotation of the screw $m^4$.

On the plate $h$, (see Figs. 1 and 6) extending upward therefrom is a bracket $p$, to which is fixed pendent a U-arm, $p'$. A sleeve $q$ is fixed on the reciprocated rod $n$, and such sleeve is connected with the U-arm $p'$ by the pivoted links $q'$. The slots $q^2$ of the links $q'$ permit the latter to accommodate the longitudinal movement of the sleeve $q$, without binding.

The action of the springs $j^3$, (see Fig. 2ª)

throwing the male clutch-member $j$ into engagement with the female clutch member $i^3$, is overcome periodically by one or the other of the toes $k^3$, of the cam disk $k^2$, bearing against the toe $n^3$ of the slotted head $n'$ of the rod $n$. The longitudinal movement of the latter will bring the toe $n^3$, out of the path of one of the toes $k^3$ on the disk $k^2$ and into the path of the other, (compare Figs. 2, 2$^b$) and the contact between the toe $n^3$ with either of the toes $k^3$ will disengage the clutch members $i^3$, $j$. The bevel faces of said toes facilitate their described action.

The shifter element $r$, (see Figs. 1 and 6) is adapted to reverse the position of the clutch sleeve $o^3$. This shifter element is made in the form of a toggle joint, and comprises a lever $r'$ pivoted on the bracket $r^2$, bolted on the lower portion of the plate $h$. An anti-friction roller $r^3$ is pivoted on the lever $r'$, and as the latter is operated the roller $r^3$ is caused to bear against either of the flanges of the clutch-sleeve $o^3$, thereby shifting the latter out of clutch engagement with one of the gears $o'$ or $o^2$, and into engagement with the other, so as to reverse the drive of the screw $m^4$. Anti-friction rollers $q^3$ and $r^4$, are provided on the links $q'$, and lever $r'$ respectively, and to facilitate the movement of the lever $r'$ when thrown over by the longitudinal movement of the rod, $n$. The other parts of the shifter element $r$, comprise a threaded rod $r^5$, the lower end of which is pivotally connected to the upper end of the lever $r'$, and the upper end of the rod $r^5$ is free to slide longitudinally in a trunnioned bearing $r^6$, which is mounted in the bracket $p$; and the compression spring $r^8$ bearing on the adjustable nut $r^7$, normally tends to collapse the toggle joint. That is to say the longitudinal movement of the rod $n$ and the consequent throw of the lever $r'$, will compress the spring $r^8$, and as soon as the lever $r'$ moves over center, such spring will throw the lever quickly into reverse position. Furthermore the lever $r'$ will be restrained by the spring $r^8$ against reverse movement until the rod $n$ is again moved in an opposite direction.

Figure 7:
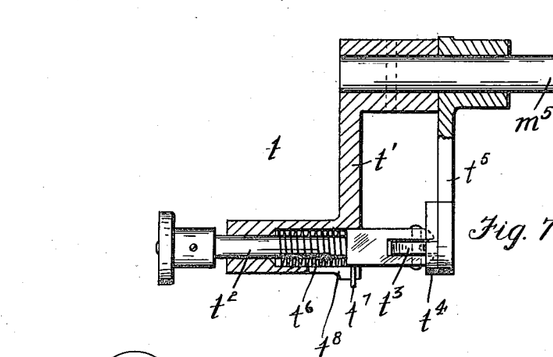
Fig. 7 is a sectional plan view of the lock which holds the split nut in either its operative or inoperative state.

$m^5$, is a rod journaled in the brackets $m$, $m$, and it extends to the front end (being the left end in Fig. 1) of the machine, where it is journaled in a bearing $t^5$. (See Fig. 7). On the rod $m^3$ are hinged the members $s'$, $s^2$, of the split nut $s$. See Fig. 3. The member $s'$ is provided with a U-portion $s^4$ which hooks over the rod $n$ and has a pointer $s^5$, which indicates on the scale $m'$ the number of sheets which are in the rewound roll at time of observation. The pointer furthermore indicates the position in which the stops $v$, $v'$, which limit the travel of the nut, $s$, must be placed in, in order to make the machine produce rewound rolls of predetermined sizes. Slidably keyed on the rod $m^5$, is a sleeve $u$, on which is fixed a flanged collar, $u'$. The two members $s$, $s^2$ of the split nut are connected by jointed arms $s^6$, $s^7$, to the flanges of the collar, $u$, and the partial rotation of the rod $m^5$ and therewith the collar $u$, causes the split nut $s$ to open or close, thus either having operative engagement with, or clearing the screw $m^4$. The split-nut is the connecting medium, as it were, in the automatic mechanism of my machine, and if the automatic mechanism is to be thrown out of service for a time the split nut $s$ is opened so as to be disengaged from the screw $m^4$. The split-nut $s$ is held in its open or closed state by the corresponding rotation of the rod $m^5$, and the latter is locked in either position by a spring latch $t$ shown in Figs. 1 and 7. This latch comprises a crank arm $t'$ fixed on the rod $m^5$, provided with a spring-controlled bolt $t^2$ having on its extremity a roller $t^3$, which is adapted to sit in either of the notches of the notched plate $t^4$. The bolt-spring is indicated by $t^6$. A stud $t^7$ on the bolt $t^2$ slides in a slot $t^8$, of the crank arm $t'$, and prevents said bolt from turning in its bearings. The split-nut members $s'$, $s^2$, are made with laterally projecting arms $s^8$, $s^9$, respectively, beveled on their opposed faces. These arms extend between the collar $u'$ slidable on the rod $m^5$; therefore the movement of the split-nut $s$ will carry with it the sleeve $u$. The stops $v$, $v'$, are adjustably fixed on the rod $n$ by set screws, (see Fig. 4), and are provided with lateral wedges $v^2$, $v^3$, facing each other. The lower ends of the stops are slidable on the rod $m^3$. When the rotation of the screw $m^4$ causes the split-nut $s$ to bear against either of the stops $v$ or $v'$, the rod $n$ will be correspondingly moved in the direction of travel of said nut, until the drive of the screw $m^4$ is reversed, effected as follows: The movement of the rod will operate the reversing gear $o$, and the latter will change the direction of the rotation of the screw $m^4$, thereby reversing correspondingly the travel of the split nut $s$. The longitudinal movement of the rod $n$ will also release the cam disk $k^2$, (see Fig. 2$^b$) and permit the male clutch member $j$, to be thrust into engagement with the continually driven clutch member $i^3$. The crank arm, $i'$ will then be given one complete revolution before the clutch member, $j$, is automatically disengaged again as mentioned. During the contact of the split nut $s$, with either of the stops $v$, $v'$, the wedge elements $v^2$ or $v^3$, will be relatively thrust between said bevel faced arms $s^8$, $s^9$, of the split-nut members $s'$, $s^2$, thereby forcing the half parts of the nut together on the screw $m^4$, and insuring the operation of the rod $n$, for if the latter should fail to properly operate, there would be no reversal of the drive screw $m^4$, and no proper action of the crank arm $i'$.

Figure 9:
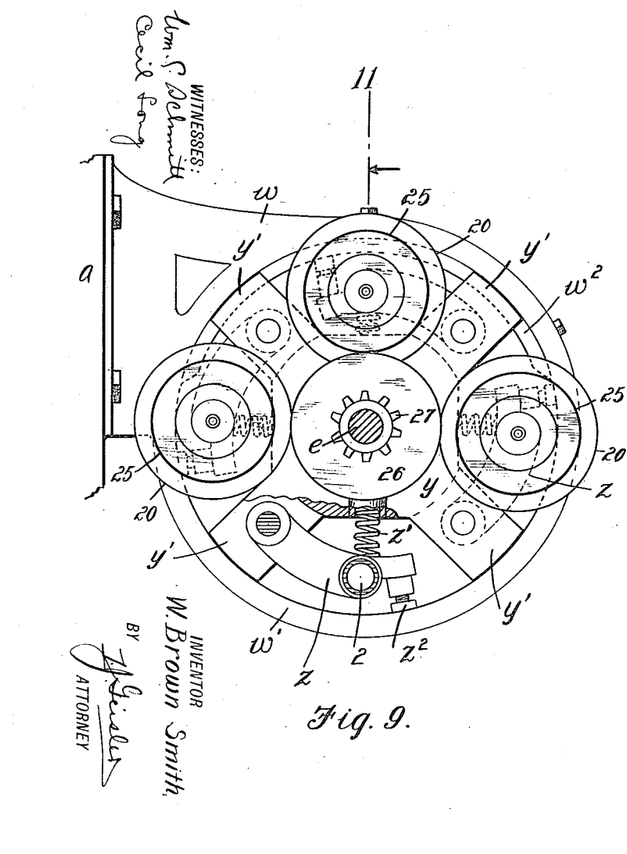
Fig. 9 is a side elevation of the rewinder, showing the means by which the rewinder reels are consecutively rotated; this view is taken from the far side of the machine, thus opposite to that shown in Fig. 1, and the lower portion is broken away to show details of construction.
Figure 10:
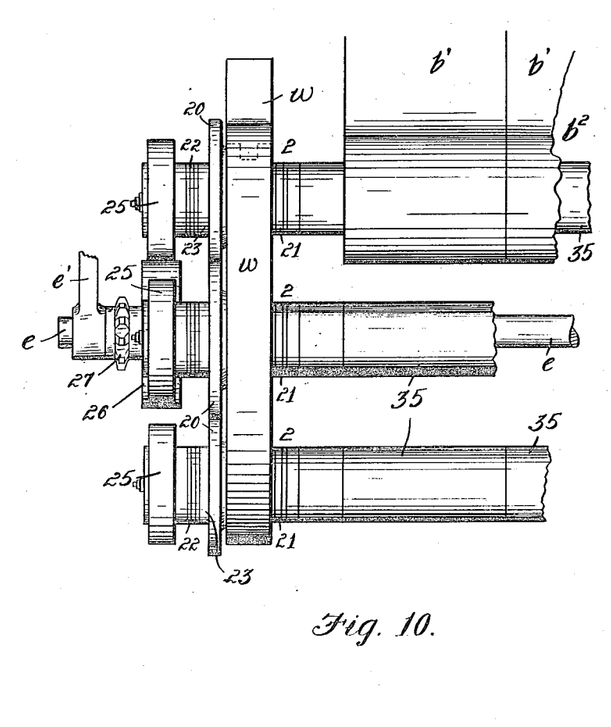
Fig. 10 is a partial right side elevation of the mechanism shown in Fig. 9.
Figures 11, 12, 13, 14:
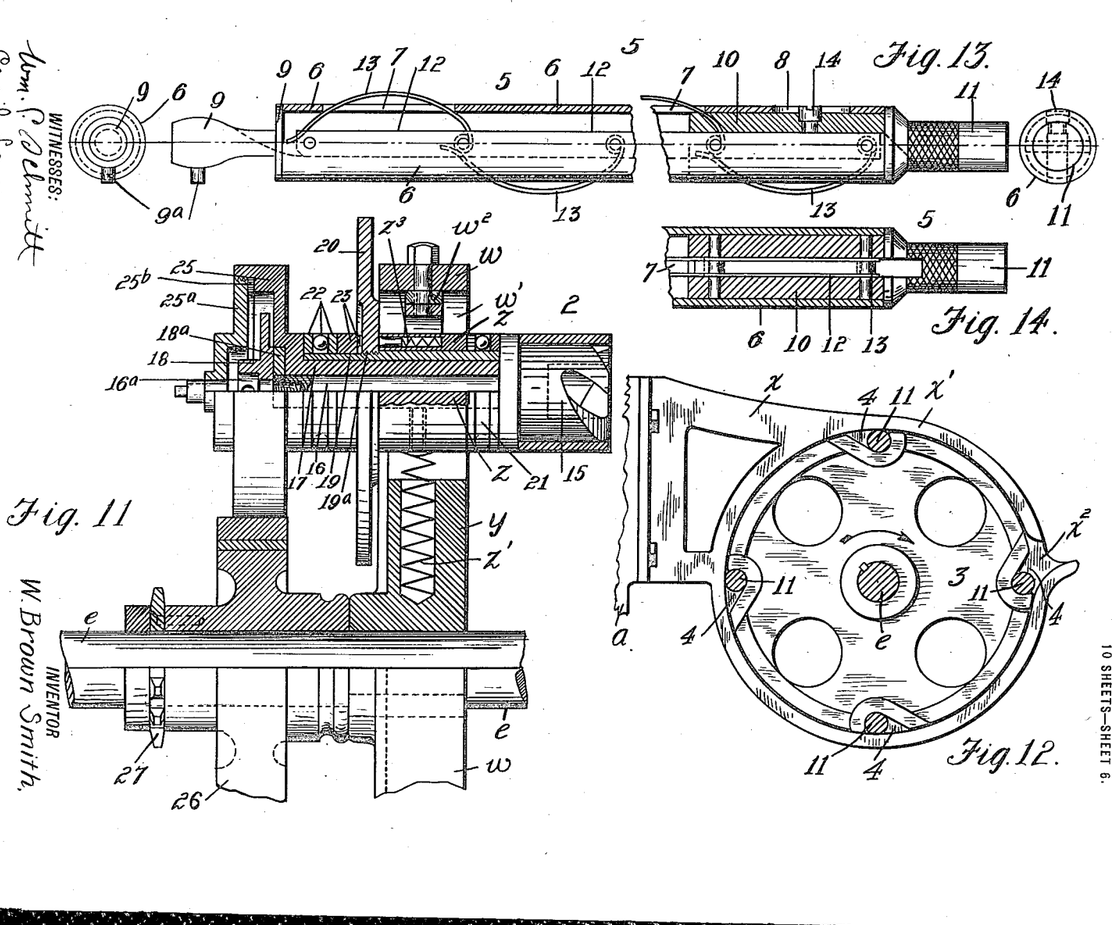
Fig. 11 is a larger scale sectional view taken approximately on line 11 of Fig. 9.
Fig. 12 is an interior elevation of the near side bearing for the rewinder reel; the shaft for the reel and the arbors are shown in section; this figure shows the means by which the arbors are supported at this part of the reel and how the arbors are inserted for winding and removed when wound.
Fig. 13 is a sectional view of one of these arbors upon which the rolls are rewound; this view also shows elevations of both ends of the arbors.
Fig. 14 is a sectional view of the arbor taken at right angle to the section shown in Fig. 13.

At the front (left) end of the machine are provided two brackets, w, x, of which the bracket x alone is seen in Fig. 1. The details of the bracket x and associated parts is shown in Fig. 12, and the details of the bracket w is shown in Fig. 9. The bracket w consists of a ring, w', to which is bolted a cam $w^2$. See Figs. 9 and 11. The shaft e, journaled in the arms e', extends through said brackets.

On the shaft e, within the bracket w is fixed a spider y, having four radial arms y' the extremities of which are bifurcated and straddle the cam $w^2$ as the spider rotates with the shaft e in the bracket w. To each of said arms, y', is pivoted a chuck-holding arm z, normally controlled by a spring z'. Each chuck-holding arm has at its extremity an adjustable bearing head $z^2$, held to bear on the inner periphery of the bracket, w, by the spring z', and adapted to climb on the cam $w^2$, of the bracket as the spider is rotated. The chuck-holding arms z, carry the rotatable chucks 2, in which one end of the core arbor 5 is inserted.

The bracket x, has a peripheral flange x' made with an inlet and outlet opening $x^2$. See Fig. 12. An arbor-bearing disk 3, fixed on the shaft e, rotates within the flange of the bracket x, and is provided on its periphery with half-boxes 4, for removably receiving the journal ends 11, of the core arbor 5. The insertion and removal of the arbors is effected by bringing the half boxes 4 into registration with the opening $x^2$ of the flange x'.

A convenient type of core arbor is shown in Figs. 13 and 14. This core arbor consists of a tube 6, provided with longitudinal slots 7, 8. The core-arbor is made with a clutch end 9, having a lock-stud $9^a$. The clutch end 9, is adapted to be inserted in the chuck 2. Compare Figs. 11 and 13. At the other end of the core-arbor is a journal-end 11, adapted to be seated in the half-boxes 4 of the disk 3, of the rewinder-reel. See Fig. 12. The journal end 11 is an integral part of a bar 12, extending longitudinally in the tube 6 of the core-arbor 5. On the bar 12 are fastened bow springs 13, adapted to spring out through the slots 7, of the core arbor. A set-screw 14 holds the bar 12 against rotation and also limits its longitudinal movements. The movement of the bar 12 in one direction will project the springs 13 through the slots 7 and cause them to grip and hold the cores in place on the core arbor. After the cores have been wound, the bar 12 is moved in the reverse direction to draw in the springs 13, thereby releasing the cores of the wound rolls, and facilitating their removal and the substitution of another set of blank cores.

A convenient type of rotatable chuck is shown in Fig. 11 and consists of a socket head 15, made with a stem 16. A sleeve 17 is mounted on the stem 16 and has on its outer end a friction bowl 25. A friction disk 18, is fastened on the end of the stem 16 by a pin, $16^a$, and holds the sleeve 17 in place. An oil pad $18^a$ is placed under the disk 18. The bowl 25 is filled with oil, and the cover $25^a$ is then screwed in place. Packing $25^b$ prevents the oil from leaking out. On the tubular sleeve 17 of the friction bowl 25 is a bushing 19, made with a thread $19^a$ on which is screwed a friction adjustment hand-wheel 20. The chuck-holder arm z is mounted on the bushing 19, and a ball-bearing element 21, is placed between the latter and the socket-head 15 of the chuck. An expansion spring $z^3$, in the arm z, bears against the hand-wheel 20, and tends to exert a thrust on the ball-bearing 21. Another ball-bearing element 22, is placed on the bushing 19, adjacent to the friction bowl 25, and an expansion spring element 23, interposed between the ball-bearing 22 and the hand-wheel 20, causes the bowl 25 to bear on the disk 18. The frictional bearing between the chuck-head 2 and the bowl 25 is adjusted by turning the hand-wheel 20.

As shown in Figs. 9 and 11, a friction gear 26 is loosely mounted on the shaft e, and carries a sprocket 27, connected by a sprocket chain 28 (see Fig. 28) with the constantly driven member 29, of the inter-gear train which transmits motion from the gears d'.

The spider y and the disk 3 are rigidly mounted on the shaft e and constitute the rewinder-reel of my machine. This rewinder reel is given a quarter revolution, progressively, by the action of the crank-arm i'. The connection between the shaft e and the crank arm i' consists of a dog-and-ratchet element so arranged that whenever the crank-arm i' is given its complete revolution, the rewinder-reel will be given a quarter revolution. By the progressive rotation of the rewinder-reel, the chucks holding the core-arbors are successively brought to the top of the reel; and when so positioned the bearing head $z^2$ of the arm z, will bear on the cam $w^2$, and cause the periphery of the friction bowl 25 of the chuck to have operative contact with the gear 26 fast on the shaft, thereby rotating the core arbor and winding up the strips of paper b', which have previously been automatically pasted to the cores 35, mounted on such core-arbor. The direction of rotation of the rewinder-reel is indicated by an arrow in Figs. 1 and 12.

In the operation of my machine the core arbor with the blank cores is inserted at $w^2$, of the rewinder-reel; (see Fig. 12) such core arbor is next brought to the top and finally this core arbor is carried back to the outlet $x^2$ and removed. Immediately after a core-arbor has been removed it is replaced by another with blank cores. While the reel is at rest, the cores on the core-arbor positioned at the bottom of the reel have paste applied to them automatically by a rotating paste brush 31, revolving in a paste trough, 32. See Figs. 1, 8 and 28. The paste brush is driven by a sprocket chain, 33, which connects the continually driven sprocket, $i^5$, of the clutch element, $i^3$, (see Fig. 2) and a sprocket wheel 34, the latter fixed on the axle of the paste brush 31.

Figure 8:
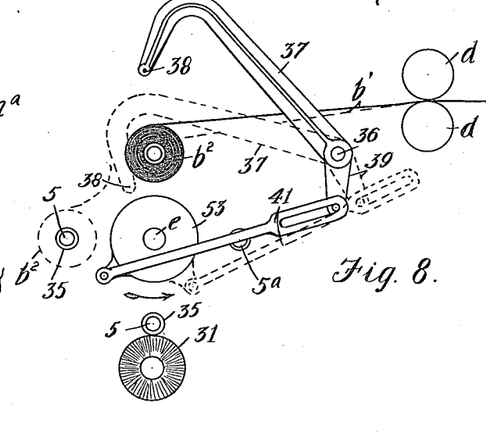
Fig. 8 is a diagram view showing the manner in which the cutter element operates.
Figure 15:
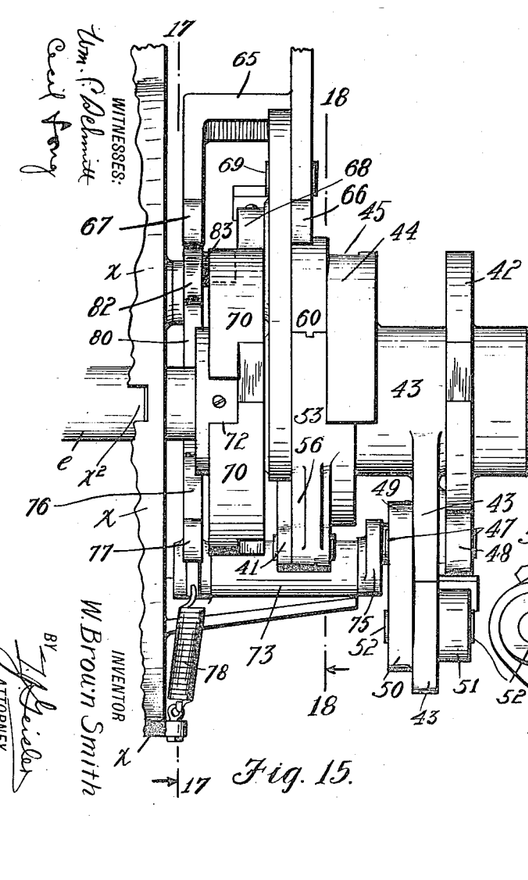
Fig. 15 is a larger scale left side elevation with respect to Fig. 1 of the dog and ratchet element by which the rewinder-reel is progressively rotated by the throw of the crank-arm $i'$.
Figure 16:
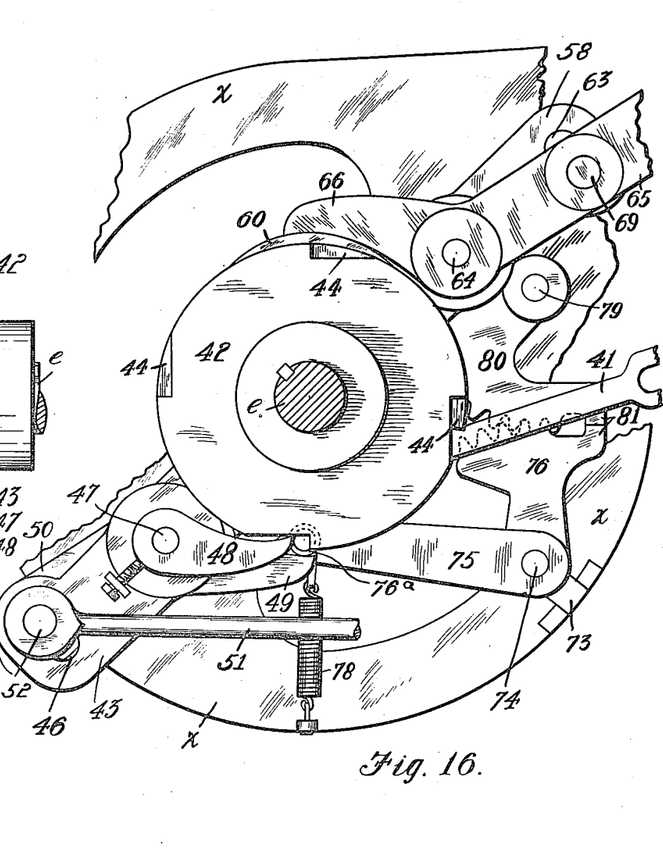
Fig. 16 is a larger scale fragmental view of these parts looking at them as seen in Fig. 1.
Figures 17, 18:
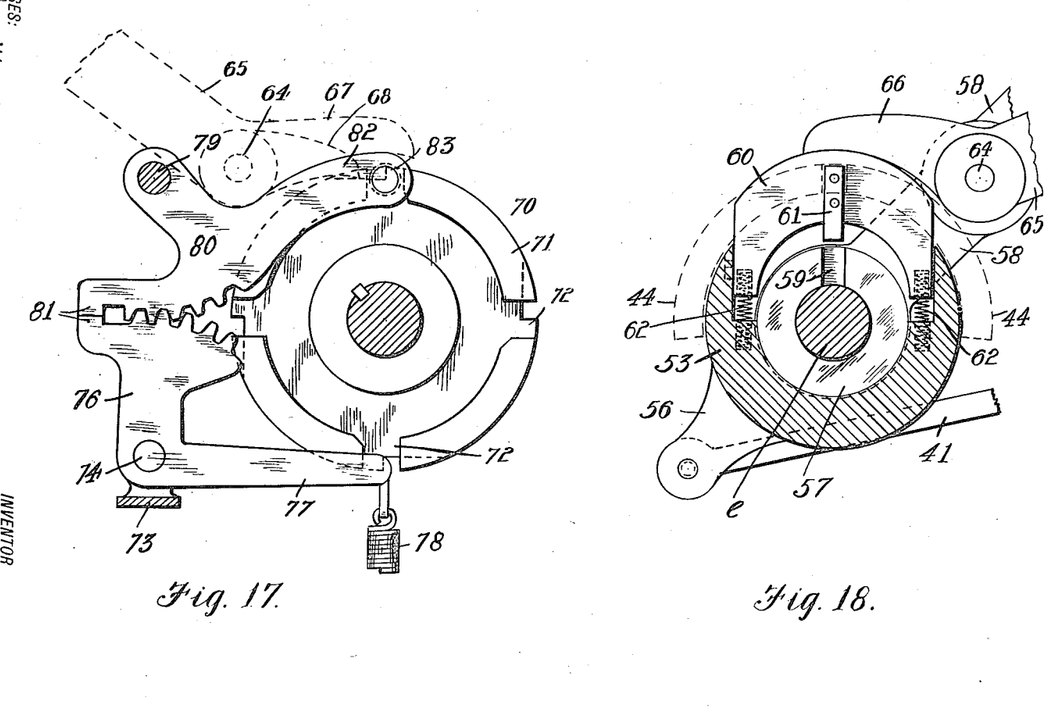
Fig. 17 is a sectional view taken on the line 17—17 of Fig. 15.
Fig. 18 is a sectional view taken on the line 18—18 of Fig. 15.
Figures 19, 20, 20A, 21, 22, 23, 24, 25, 26, 27:
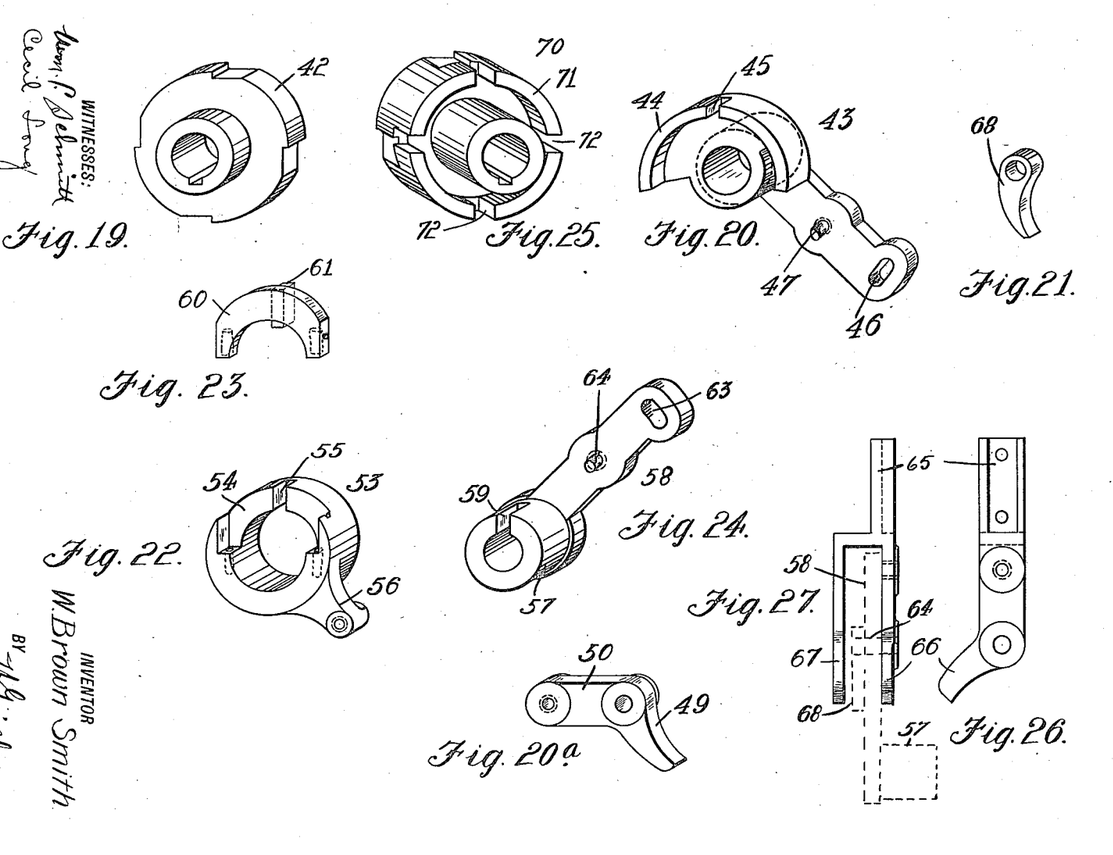
Figs. 19–25 inclusive are isometric views of the members which make up the dog and ratchet element shown in assembly in Figs. 15–16.
Fig. 26 is a side elevation of a portion of the hand lever.
Fig. 27 is a front elevation of the same, showing in dotted lines certain of the members associated with it.

In order to cut off the strips of winding paper from the finished rolls I provide an automatic cutter mechanism arranged as follows: A shaft 36, journaled in the frame $a$, has fixed on it two arms 37, curved at their extremities as shown in Figs. 1 and 8. A cutting wire 38 is held taut between the ends of the arms. A crank-arm 39 is fixed on the shaft 36. A spring controlled element 40 (see Fig. 1) has a tendency to hold the arm 37, in uplifted position. A slotted link 41 so operatively connects the cutter element with the dog-and-ratchet element shown in Figs. 1, 15 and 16 as to operate the cutter once during each quarter revolution of the rewinder-reel. The coöperation between the cutter and the rewinder reel is illustrated in the diagrammatic view, Fig. 8. The dog-and-ratchet element consists of a ratchet pinion 42, adjacent to which there is loosely mounted on the shaft $e$, a crank-arm 43 the hub of which is made with a flange 44, having a notch 45. See detail Fig. 20. The crank-arm 43 has at its extremity a circular slot 46, and it has studs 47 projecting laterally from both sides. On the stud 47 is pivoted a pawl 48, (see Figs. 15 and 16) and on the opposite stud 47, is pivoted an arm 50, made with a toe 49, the details of which are shown in Fig. 20ª. The arm 50 has a pin 52 on which is fastened one end of a rod 51; the pin 52 extends through the slot 46 of the crank-arm 43. When the rod 51 is moved to the left by the rotation of the crank-arm $i'$, the arm 50 will first be rocked and when the pin 52 strikes the end of the slot 46 of the arm 43, then the latter will be rocked. Adjacent to the arm 43 is a loose collar 53, shown in Figs. 15 and 22, which collar bears inside the flange 44 of the crank arm 43. The collar has a portion cut away at 54 (see Fig. 22) and a recess 55 adapted to be placed in registration with the recess 45 of the crank-arm, 43. The collar 53 is made with an arm 56 to which is connected the slotted link 41, of the cutter element. See Figs. 15 and 18. The collar 53 is rotatably mounted on the hub 57 of the crank arm 58, (see Figs. 18 and 24) the latter being loosely mounted on the shaft $e$. The hub 57 of the crank arm 58 is made with a notch 59, located for being brought into registration with the notches 45 and 55 of the crank arm 43 and the collar 53 respectively. 60 is a latch plate made with a lug 61. See Figs. 18 and 23. The latch plate is seated on compression springs 62, arranged as shown in Fig. 18 and normally so supporting the latch-plate 60 as to cause the lug 61 of the latter to be located in the notches 45 and 55 of the crank arm 43 and collar 53, thereby locking the latter two parts together. See Fig. 18. When the latch plate 60 is depressed against the springs 62, then its lug 61 will be moved into the notch 55 of the collar 53 and the notch 59 of the crank arm 58, thereby locking these two parts together. It will be seen therefore that the collar 53 is in locked engagement either with the crank-arm 43 or the crank arm 58. The crank arm 58 has a curved slot 63 at its extremity and laterally, oppositely projecting studs 64. A hand lever 65 (see Figs. 15, 16, 17, 26 and 27), is made with a bifurcated toe the members 66, 67 of which straddle the crank arm 58. The toe-member 66 of this lever is pivoted on one of the studs 64 of the crank arm 58. See Fig. 16. On the opposite stud 64 of the hand lever is pivoted a pawl 68. (See detail of latter, Fig 2.) The hand lever 65 has a stud 69 which bears in the slot 63 in the crank arm 58. See Fig. 16. On the shaft $e$ is further mounted a fixed ratchet wheel 70, (see Figs. 15, 17 and 25) having a flange 71 on one side made with peripheral notches 72. The teeth of the ratchet wheel 70 are engaged by the pawl 68 as shown in Figs. 15 and 17. The bracket $x$ is provided with a bearing 73, (see Fig. 15) in which is journaled a shaft 74, (see Fig. 16) on one end of which is a crank-arm 75, having a roller 76ª which overlies the toe 49 of the arm 50. On the other end of the shaft 74 is a sector-gear 76 having an arm 77 controlled by a spring 78 one end of which is fastened to the bracket $x$, as shown in Figs. 15, 16 and 17. On the stud 79 projecting from the bracket $x$, (see Figs. 16 and 17) is pivoted a companion sector-gear 80, meshing with the sector gear 76. The sector gears 76 and 80 are provided with stops 81, to limit their rotation. The sector gear 80 has an arm 82 bearing at its extremity a cam-roller 83 which is normally positioned in one of the notches 72 of the ratchet-wheel 70. See Fig. 17. The last described devices constitute a locking mechanism for the ratchet wheel 70. The member 67 of the bifurcated toe of the hand-lever 65 overlies the arm 82 of the sector gear 80 (see Figs. 15 and 17) and rocks the latter. The rotation of the crank arm $i'$ will cause the rod 51 to rock the arm 50, pivoted on one stud 47 of the crank arm 43. Such rocking of the arm 50 will cause its toe 49 to bear against the roller 76ª and on the crank arm 75 and lift the latter. The crank arm 75 being fixed on the shaft 74 will cause the rocking of the latter and therewith the sector gear 76, which actuating the sector gear 80 will cause the roller 83 to be moved down out from the notch of the ratchet wheel 70, thus unlocking the latter. The continued movement of the link 51 moves the crank arm 43 and causes the pawl 48 to engage the ratchet wheel 42 and rotate the latter a quarter revolution, and therewith the shaft $e$ and the rewinder-reel thereon mounted. The crank arm 43 and collar 53 are locked together by the lug 61 of the latch plate 60, as previously mentioned, and the throw of the crank arm 43 will carry with it the collar 53. This movement will cause the link 41 to operate the cutter element; the slot of the link 41 being so arranged as to cause the cutter to act at the latter end of each quarter revolution of the rewinder-reel. The completion of the revolution of the crank arm $i'$ will restore again all parts to their initial positions.

The rewinder-reel may also be progressively rotated by hand independently of said automatic devices, as follows: The hand lever 65 is pulled forward, causing its toe members 66 and 67 to simultaneously depress the latch plate 60 and operate the sector gear 80. The depression of the latch plate 60, will break the locking engagement between the collar 53 and the crank arm 43 and instead lock the collar 53 and the crank arm 58 together; (see Fig. 16) simultaneously the sector-gear 80 will be operated to release the ratchet-wheel 70 and leave the latter free to rotate with the shaft $e$. The further movement of the hand-lever 65 will cause its stud 69 to rock the crank-arm 58 forward, and the ratchet wheel 70 will be engaged by the pawl 68 of the crank arm 58, whereby the shaft $e$ and the rewinder-reel will be given a greater revolution. The rewinder-reel may be rotated at any time by the hand-lever 65 except when the automatic means for rotating the rewinder reel are acting.

An auxiliary feature of this machine consists in an audible alarm-signal, which is operated by the travel of the split-nut $s$, and is arranged to give signal to the operator shortly before the rewinder-reel is given its progressive quarter revolution. This alarm is shown in Figs. 1, 3, 4 and 5 and comprises a rod 84 having its ends supported in fiber bushings 85 in the brackets $m$. Sleeves 86, of insulating material are slidable on said rod 84, and each sleeve carries an electrical contact member 87 adapted to make electrical contact with said rod 84, when depressed by the passage of the pendent arm 88, which is carried by the lower member $s^2$ of the split-nut $s$. See Fig 3.

A bell 89, battery 90, and circuit wire 91 electrically connecting the rod 84 and the contact member 86 complete the signal apparatus.

The general operation of the machine is as follows: The strips of paper are wound on the blank cores mounted on the consecutively revolved core 5, carried by the chucks of the rewinder-reel, the paper wound on the cores being drawn through the machine from the large roll of paper $b$. The split-nut $s$ travels along the revolving screw, $m^4$, until it contacts with one of the stops $v$, $v'$. This causes a longitudinal movement of the rod $n$ and the temporary engagement of the clutch members $i^3$ and $j$. The crank-arm $i'$ will then be given one complete revolution, and the rewinder-reel will be given a quarter revolution. At the end of such quarter revolution of the rewinder-reel, the cutter will be thrown into action, as illustrated in Fig. 8, by the dotted lines. By the successive quarter revolution of the rewinder-reel, the arbor on which the roll $b^2$ has been wound will be carried to the inlet, $x^2$, of the bracket $x$, (see Figs. 8 and 12) so that it may be removed. The cutter mechanism is timed to act just as the winding of the roll $b^2$ is completed and the rewinder reel is being given its next quarter revolution. During such motion of the rewinder reel, the strips of paper $b'$ will be dragged over the cores to which adhesive has been applied and when said strips are cut off by the wire 38 of the cutter, the momentum of the rewound roll $b^2$ will cause the free end of the strip thereon wound up to be pasted on said roll while the other free ends of the same strips will adhere to the core being moved up in rewinding position. The split-nut $s$ now travels in a reverse direction until it again strikes a stop $v$, or $v'$ and in this manner the automatic mechanism is periodically thrown into action for the purposes described.

The word size of roll as used in claims has reference to number of sheets or lineal feet, in short the quantity of paper contained in the roll.

I claim:

1. In a machine of the character described, a reel, a continually driven pinion journaled on the axis of the reel, core-arbors journaled in the circumference of the latter, a companion pinion carried by each core-arbor, means normally holding the companion pinions out of contact with said driven pinion, automatic means for moving said companion pinion into contact with said driven pinion during the rotation of the reel, and means for periodically rotating the latter.

2. In a machine of the character described, a reel, core-arbors journaled in the circumference of the reel, means for rotating the core-arbors, such means normally inactive, cam elements adapted to throw such means into action during the rotation of the reel, and thereby causing the successive rotation of the core-arbors, and means for partially rotating the latter, periodically.

3. In a machine of the character described, a revoluble shaft, a reel mounted thereon, a pinion loose on the shaft of the reel, means for rotating such pinion, a plurality of core-arbors radially disposed at one end of the reel, arms hinged at radially disposed points on the other end of the reel, core-arbors carried by such hinged arms, companion pinions carried by the latter core-arbors, a flange disposed circumferentially of the reel, a cam-element on such flange, the extremities of said hinged arms bearing on said flange, and means for holding said arm extremities on said flange.

4. In a machine of the character described, a revoluble shaft, a reel mounted thereon, a pinion loose on the shaft of the reel, means for rotating such pinion, a plurality of core-arbors radially disposed at one end of the reel, arms hinged at radially disposed points on the other end of the reel, core-arbors carried by such hinged arms, companion pinions carried by the latter core-arbors, a flange disposed circumferentially of the reel, a cam element on such flange, the extremities of said hinged arms bearing on said flange, means for holding said arm extremities on said flange, and means for periodically rotating the reel.

5. In a machine of the character described, a revoluble shaft, a reel mounted thereon, a pinion loose on the shaft of the reel, means for rotating such pinion, means on one end of the reel for holding core-arbors, arms hinged at radially disposed points on the other end of the reel, core-arbor holding devices carried at the extremities of such hinged arms, companion pinions carried by said holding-devices, a flange disposed circumferentially of the reel, a cam-element on such flange, the extremities of said hinged arms bearing on said flange, means operating to hold such extremities on said flange.

6. In a machine of the character described, comprising a reel, core-arbors journaled at the circumference of the reel, means for rotating such core-arbors independently, such means adapted to be successively thrown into and out of action by the rotation of the reel, means for progressively rotating the reel, a prime mover, and a device between the latter and such reel-rotating means, adapted to operate the reel-rotating means periodically such device adjustable to vary the time of action.

7. In a machine of the character described, comprising a reel, core-arbors journaled at the circumference of the reel, means for rotating such core-arbors independently, such means adapted to be successively thrown into and out of action by the rotation of the reel, means for progressively rotating the reel, a prime mover, a device between the latter and such reel-rotating means, adapted to operate the reel-rotating means periodically, such device adjustable to vary the time of action, and manual means for interrupting such driving connection while the machine is in action.

8. In a machine of the character described, comprising a reel, core-arbors journaled at the circumference of the reel, means for rotating such core-arbors independently, such means adapted to be successively thrown into and out of action by the rotation of the reel, and means for partially rotating the reel progressively, a prime mover, a device between the latter and such reel-rotating means, adapted to operate the reel-rotating means periodically, and means controlling the action of said device, such means including a member traveling to and fro and a part against which the traveling member impinges, whereby the controlling means are thrown into action.

9. In a machine of the character described, comprising a reel, core-arbors journaled at the circumference of the reel, means for rotating such core-arbors independently, such means adapted to be successively thrown into and out of action by the rotation of the reel, means for partially rotating the reel progressively, a prime mover, a device between the latter and such reel rotating means, adapted to operate the reel rotating means periodically and means controlling the action of said device, such means including a member traveling to and fro and an adjustable part against which the traveling member impinges, whereby the controlling means are thrown into action.

10. In a machine of the character described, comprising a reel, core-arbors journaled at the circumference of the reel, means for rotating such core-arbors independently, such means adapted to be successively thrown into and out of action by the rotation of the reel, and means for progressively rotating the reel, an intermittently driven member, a connection therefrom to said reel-rotating means, and means controlling the action of said intermittently driven member, such controlling means including a reciprocated member and abutments for the latter member, such abutments located at the ends of the path of said reciprocating member, and against which said latter impinges whereby the controlling means are thrown into action, to thereby actuate said intermittently driven member.

11. In a machine of the character described, comprising a reel, core-arbors journaled at the circumference of the reel, means for rotating such core-arbors independently, such means adapted to be successively thrown into and out of action by the rotation of the reel, and means for progressively rotating the reel, an intermittently driven member, a connection therefrom to said reel-rotating means, and means controlling the action of said intermittently driven member, such controlling means including a reciprocated member, and abutments for the latter member, such abutments adjustably located at the ends of the path of said reciprocated member, and against which said latter impinges, whereby the controlling means are thrown into action, to thereby actuate said intermittently driven member.

12. In a machine of the character described, the combination with a reel, core-arbors journaled at the circumference of the reel, means for rotating such core-arbors independently, such means adapted to be successively thrown into and out of action by the rotation of the reel, of means partially rotating the reel progressively, a revoluble screw, a nut mounted on the screw, a longitudinally movable rod parallel to said screw, stops affixed on said rod, adapted for being engaged by said nut to thereby longitudinally move said rod, means for rotating the screw in opposite directions, such means including and controlled by a device, a clutch operated by said rod, a constantly driven crank-shaft, a crank arm loose on the latter, a clutch operable to engage such crank arm with said crank shaft, means for throwing the latter clutch in and out, a connection between said rod and said clutch operating means, and a link connecting said crank arm with said reel-rotating means.

13. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a nut mounted on the screw, a longitudinally movable rod parallel to said screw, stops adjustably affixed on said rod, adapted for being engaged by said nut to thereby longitudinally move said rod, means for rotating the screw in opposite directions, such means including and controlled by a device, a clutch operated by said rod, a constantly driving crank shaft, a crank arm loose on the latter, a clutch operable to engage such crank arm with said crank shaft, means for throwing the latter clutch in and out, a connection between said rod and said clutch operating means, a link connecting said crank arm with said reel-rotating means.

14. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a split-nut mounted on the screw, a longitudinally movable rod parallel to said screw, stops affixed on said rod, adapted for being engaged by said split-nut to thereby longitudinally move said rod, auxiliary manual means for opening the split-nut, means for rotating the screw in opposite directions, such means including and controlled by a device, a clutch operated by said rod, a constantly driven crank shaft, a crank arm loose on the latter, a clutch operable to engage such crank arm with said crank shaft, means for throwing the latter clutch in and out, a connection between said rod and said clutch operating means, and a link connecting said crank arm with said reel-rotating means.

15. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a split-nut mounted on the screw, a longitudinally movable rod parallel to said screw, stops affixed on said rod adapted for being engaged by said split-nut to thereby longitudinally move said rod, means for holding the split-nut against opening at the instant of its contact with either of said stops, auxiliary manual means for opening the split nut, means for rotating the screw in opposite directions, such means including and controlled by a device, a clutch operated by said rod, a constantly driven crank-shaft, a crank-arm loose on the latter, a clutch operable to engage such crank arm with said crank-shaft, means for throwing the latter clutch in and out, a connection between said rod and said clutch operating means, a link connecting said crank-arm with said reel-rotating means.

16. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a nut mounted on the screw, a longitudinally movable rod parallel to said screw, stops affixed on said rod, adapted for being engaged by said nut to thereby longitudinally move said rod, a scale, a pointer carried by the nut and moving over the scale, means for rotating the screw in opposite directions, such means including and controlled by a device, a clutch operated by said rod, a constantly driven crank shaft, a crank arm loose on the latter, a clutch operable to engage such crank arm with said crank shaft, means for throwing the latter clutch in and out, a connection between said rod and said clutch operating means, a link connecting said crank arm with said reel-rotating means.

17. In a machine of the character described, the combination with a reel, core-arbors journaled at the circumference of the reel, means for rotating such core-arbors independently, such means adapted to be successively thrown into and out of action by the rotation of the reel, of means partially rotating the reel progressively, a revoluble screw, a nut mounted on the screw, a longitudinally movable rod parallel to said screw, stops adjustably affixed on said rod, adapted for being engaged by said nut to thereby longitudinally move said rod, a scale, a pointer carried by the nut and moving over the scale, means for rotating the screw in opposite directions, such means including and controlled by a device, a clutch operated by said rod, a constantly driven crank-shaft, a crank-arm loose on the latter, a clutch operable to engage such crank-arm with said crank-shaft, means for throwing the latter clutch in and out, a connection between said rod and said clutch operating means, a link connecting said crank arm with said reel-rotating means.

18. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a split-nut mounted on the screw, a longitudinally movable rod parallel to said screw, stops adjustably affixed on said rod, adapted for being engaged by said split-nut to thereby longitudinally move said rod, auxiliary manual means for opening the split nut, means for rotating the screw in opposite directions, such means including and controlled by a device, a clutch operated by said rod, a constantly driven crank-shaft, a crank arm loose on the latter, a clutch operable to engage such crank-arm with said crank shaft, means for throwing the latter clutch in and out, a connection between said rod and said clutch operating means, a link connecting said crank arm with said reel-rotating means.

19. In a machine of the character described, the combination with a reel, core-arbors journaled at the circumference of the reel, means for rotating such core-arbors independently, such means adapted to be successively thrown into and out of action by the rotation of the reel, of means for partially rotating the reel progressively, a revoluble screw, a split-nut mounted on the screw, a longitudinally movable rod parallel to said screw, stops adjustably affixed on said rod, adapted for being engaged by said split-nut to thereby longitudinally move said rod, a scale, a pointer carried by the nut and moving over the scale, auxiliary manual means for opening the split nut, means for rotating the screw in opposite directions, such means including and controlled by a device, a clutch operated by said rod, a constantly driven crank-shaft, a crank-arm loose on the latter, a clutch operable to engage such crank-arm with said crank-shaft, means for throwing the latter clutch in and out, a connection between said rod and said clutch operating means, a link connecting said crank-arm with said reel-rotating means.

20. In a machine of the character described, a revoluble shaft, a reel mounted thereon, a pinion loose on the shaft of the reel, means for rotating such pinion, core-arbor-holding-devices journaled at the circumference of the reel, a companion pinion fast on each journal of such core-arbor-holding devices, means for partially rotating the reel progressively, means normally moving the companion pinions on the journals of said core-arbor-holding-devices from said pinion on the reel shaft, and means for moving said companion pinions into operative contact with said pinion on the reel shaft successively, to thereby cause the rotation of such holding means progressively.

21. In a machine of the character described, a revoluble shaft, a reel mounted thereon, a pinion loose on the shaft of the reel, means for rotating such pinion, means on one end of the reel for holding core-arbors, arms hinged at radially disposed points on the other end of the reel, core-arbor-holding devices carried at the extremities of such hinged arms, companion pinions carried by said holding-devices, a flange disposed circumferentially of the reel, a cam element on such flange, the extremities of said hinged arms bearing on said flange, springs operating to hold such extremities on said flange.

22. In a machine of the character described, a revoluble shaft, a reel mounted thereon, a pinion loose on the shaft of the reel, means for rotating such pinion, means on one end of the reel for holding core-arbors, arms hinged at radially disposed points on the other end of the reel, core-arbor-holding devices carried at the extremities of such hinged arms, companion pinions carried by said holding-devices, a flange disposed circumferentially of the reel, a cam element on such flange, adjustable bearing heads carried by the extremities of said hinged arms and bearing on said flange, and means operating to hold such bearing-heads on said flange.

23. In a machine of the character described, a revoluble shaft, a reel mounted thereon, a pinion loose on the shaft of the reel, means for rotating such pinion, means on one end of the reel for removably holding one end of the core-arbors, arms hinged at radially disposed points on the other end of the reel, chucks carried by the extremities of the hinged arms for receiving the related ends of the core-arbors, companion pinions carried by said chucks, a circumferentially disposed flange on the reel, a cam element on such flange, a bearing head carried by said hinged arms coöperating with said flange, springs operating to hold such bearing-heads on said flange.

24. In a machine of the character described, a revoluble shaft, a reel mounted thereon, a pinion loose on the shaft of the reel, means for rotating such pinion, means on one end of the reel for removably holding one end of the core-arbors, such means adapted to permit the removal of the latter at one point, and locking the same in place at all other points in the circle described by the rotation of the reel, arms hinged at radially disposed points on the other end of the reel, chucks carried by the extremities of the hinged arms for receiving the related ends of the core-arbors, companion pinions carried by said chucks, a circumferentially disposed flange on the reel, a cam element on such flange, a bearing head carried by said hinged arms coöperating with said flange, and springs operating to hold such bearing-heads on said flange.

25. In a machine of the character described, the combination of a rotatable reel carrying a plurality of core-arbors, automatic means for rotating the core-arbors successively, such means normally inactive and thrown into action by the rotation of the reel, automatic means for intermittently partially rotating the reel, a gage and devices adjustable to the latter whereby said intermittent reel rotating means are controlled, an electric-signal, an electric circuit therefor, a switch in such circuit normally open, and means coöperating with said devices controlling the action of the reel rotating means whereby said switch is closed an interval prior to the rotation of the reel.

WILLIAM BROWN SMITH.

Witnesses:
 WM. C. SCHMIDT,
 D. E. CRABB.